(12) United States Patent
Chou

(10) Patent No.: US 11,249,930 B2
(45) Date of Patent: Feb. 15, 2022

(54) NETWORK INPUT/OUTPUT STRUCTURE OF ELECTRONIC DEVICE

(71) Applicant: PORTWELL INC., New Taipei (TW)

(72) Inventor: Yen-Lung Chou, New Taipei (TW)

(73) Assignee: PORTWELL INC., Jhonghe (TW)

( * ) Notice: Subject to any disclaimer, the term of this patent is extended or adjusted under 35 U.S.C. 154(b) by 0 days.

(21) Appl. No.: 17/126,564

(22) Filed: Dec. 18, 2020

(65) Prior Publication Data

US 2021/0103540 A1 Apr. 8, 2021

Related U.S. Application Data

(63) Continuation-in-part of application No. 16/543,067, filed on Aug. 16, 2019, now abandoned.

(30) Foreign Application Priority Data

Aug. 17, 2018 (TW) .................................. 107211328

(51) Int. Cl.
*G06F 13/42* (2006.01)
*G06F 13/38* (2006.01)
*G06F 15/173* (2006.01)
*G06F 13/40* (2006.01)

(52) U.S. Cl.
CPC ........ *G06F 13/387* (2013.01); *G06F 13/4068* (2013.01); *G06F 13/4286* (2013.01); *G06F 15/173* (2013.01)

(58) Field of Classification Search
USPC .................. 710/11, 14–16, 62–64, 105, 106
See application file for complete search history.

(56) References Cited

U.S. PATENT DOCUMENTS

| 9,414,357 B2 | 8/2016 | Rudrapatna | |
| 2008/0006704 A1* | 1/2008 | Kim | G06K 19/07 235/492 |
| 2008/0274629 A1 | 11/2008 | Meyer | |
| 2013/0227185 A1 | 8/2013 | Cooklis et al. | |
| 2018/0336156 A1* | 11/2018 | Wang | G06F 13/4072 |
| 2020/0341683 A1* | 10/2020 | Liu | G06F 3/0626 |
| 2021/0173453 A1* | 6/2021 | Yamane | G06F 1/182 |

* cited by examiner

*Primary Examiner* — Ilwoo Park
(74) *Attorney, Agent, or Firm* — Muncy, Geissler, Olds & Lowe, PC

(57) ABSTRACT

A network input/output structure of an electronic device includes a FPGA module, a multiple of UART voltage conversion transceivers, at least one network connector and at least one detection module. Each UART voltage conversion transceiver has an input/output pin definition of a brand specification of a network device. The FPGA module uses the detection module to detect the pin definition of an external network device to confirm the brand specification of the network device and turn on a voltage conversion chip of the UART voltage conversion transceiver of the brand specification, so that the external network device can transmit network information with the electronic device automatically.

7 Claims, 3 Drawing Sheets

| N | [ Legacy Pin-Out ] | |
|---|---|---|
| 1 | RTS | OUT |
| 2 | DTR | OUT |
| 3 | TxD | OUT |
| 4 | GND | --- |
| 5 | CTS | IN |
| 6 | RxD | IN |
| 7 | DCD/DSR | IN |
| 8 | Not Used | --- |

95

| N | [ Cisco Pin-Out ] | |
|---|---|---|
| 1 | CTS | IN |
| 2 | DCD/DSR | IN |
| 3 | RxD | IN |
| 4 | GND | --- |
| 5 | GND | --- |
| 6 | TxD | OUT |
| 7 | DTR | OUT |
| 8 | RTS | OUT |

NETWORK INPUT/OUTPUT STRUCTURE OF ELECTRONIC DEVICE

CROSS REFERENCE TO RELATED APPLICATIONS

This application is a Continuation-in-Part of co-pending application Ser. No. 16/543,067, filed on Aug. 16, 2019, for which priority is claimed under 35 U.S.C. § 120; and this application claims priority of Application No. 107211328 filed in Taiwan on Aug. 17, 2018 under 35 U.S.C. § 119; the entire contents of all of which are hereby incorporated by reference.

FIELD OF THE INVENTION

The present invention relates to a network input/output structure of an electronic device, and more particularly to a network input/output structure capable of connecting network devices of different brand specifications automatically.

BACKGROUND OF THE INVENTION

With reference to FIG. 1 for a conventional network input/output structure of an electronic device 90, a conventional network input/output structure 90 comprises a PCIE-to-UART signal conversion chip 91, a Universal Asynchronous Receiver/Transmitter (UART) voltage conversion transceiver 92 and a network connector 93, wherein the PCIE-to-UART signal conversion chip 91 is electrically coupled to a central processing unit 94 (CPU) of the electronic device for converting a message on a PCIE channel into an UART message, and the UART voltage conversion transceiver 92 is electrically coupled to the PCIE-to-UART signal conversion chip 91, and the network connector 93 is electrically coupled to the UART voltage conversion transceiver 92, and the UART voltage conversion transceiver 92 converts the UART message into a RS232 message, so that the network connector 93 can receive the network message, and the network connector 93 is provided for the use by an external network device (not shown in the figure) to transmit network information through the UART voltage conversion transceiver 92.

However, the conventional network input/output structure of an electronic device 90 as shown in FIGS. 1 and 2 is connected to various network devices of different brand specifications, and each brand specification has its own exclusive pin definition. For example, a network device commonly used in a data center, a server, a storage system center, etc. adopts a Legacy's network device or a Cisco's network device, wherein the fifth pin 95 of the Legacy's network device is IN(±15V), and the fifth pin 96 of the Cisco's network device is GND (0V) (as shown in FIG. 2), and the network devices of different brand specifications have different pin potentials, and thus may lead to the result of the conventional network input/output structure of an electronic device 90 being used for exclusive network devices only, and a combination of different network devices cannot be used. It is necessary to manufacture a device for the output through other pin definitions again before the network input/output structure can be used in other network devices. Therefore, the conventional network input/output structure is very inconvenient to use and the cost is high.

Obviously, the conventional network input/output structure of an electronic device 90 has many drawbacks and requires improvements.

SUMMARY OF THE INVENTION

In view of the aforementioned drawbacks of the conventional input/output network device, the inventor of the present invention based on years of experience in the related industry to conduct extensive research and experiment, and finally developed an input/output network device in accordance with the present invention to overcome the drawbacks of the prior art.

Therefore, it is a primary objective of the present invention to provide a network input/output structure of an electronic device, wherein an exclusive pin definition of an external network device is detected to achieve the effects of switching and connecting to external network devices of various different brand specifications.

To achieve the aforementioned objective, the present invention provides a network input/output structure of an electronic device, comprising: a FPGA module, electrically coupled to the FPGA module and a central processing unit (CPU) of the electronic device, and having a controller for performing a logic operation; a plurality of UART voltage conversion transceivers, each being electrically coupled to the FPGA module, and each UART voltage conversion transceiver having an input/output pin definition of a network device of a corresponding brand specification; a network connector, electrically coupled to the network connector and the UART voltage conversion transceivers, and provided for the use by an external network device; and a detection module, electrically coupled to the network connector and the FPGA module, for detecting an exclusive pin definition of a network device coupled to the network connector and sending the detected pin definition to the FPGA module; wherein, the FPGA module uses the detection module to detect the pin definition to confirm a brand specification of the external network device and turns on a voltage conversion chip corresponding to the UART voltage conversion transceiver of the brand specification, so that the network device can transmit the network information through the UART voltage conversion transceiver.

In the aforementioned embodiment, the network connector is a RJ45 connector.

In the aforementioned embodiment, the external network device includes a router, a hub, a switch, and an IP sharer.

In the aforementioned embodiment, the network devices of different brand specifications include Cisco's network device, and Legacy's network device.

The present invention will become clearer in light of the following detailed description of an illustrative embodiment of this invention described in connection with the drawings.

BRIEF DESCRIPTION OF THE DRAWINGS

FIG. 2 is a table of exclusive pin definitions of a network device of different company brands.

DESCRIPTION OF THE PREFERRED EMBODIMENTS

Figure 1:
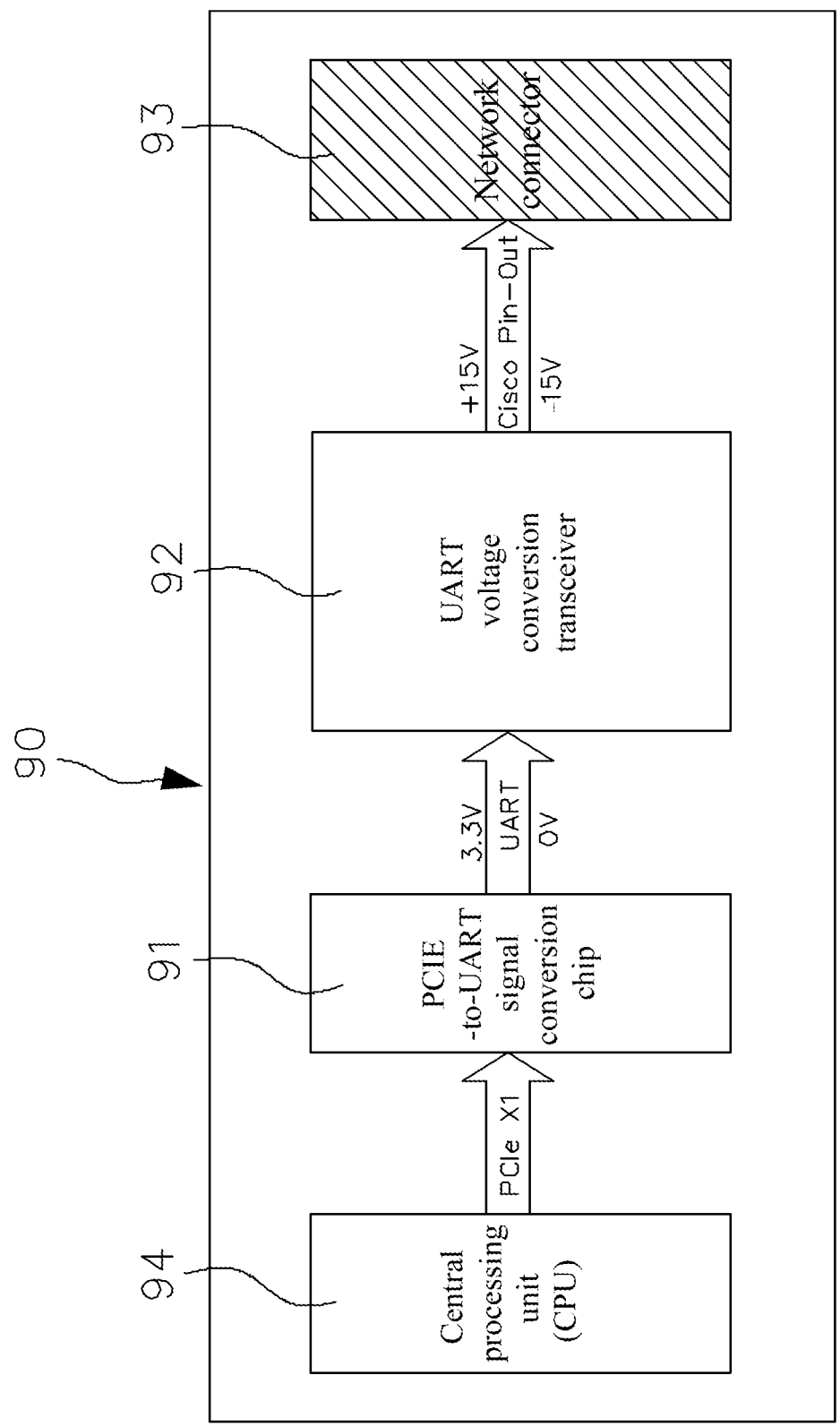
FIG. 1 is a schematic block diagram of a conventional network input/output structure of an electronic device.
Figure 3:
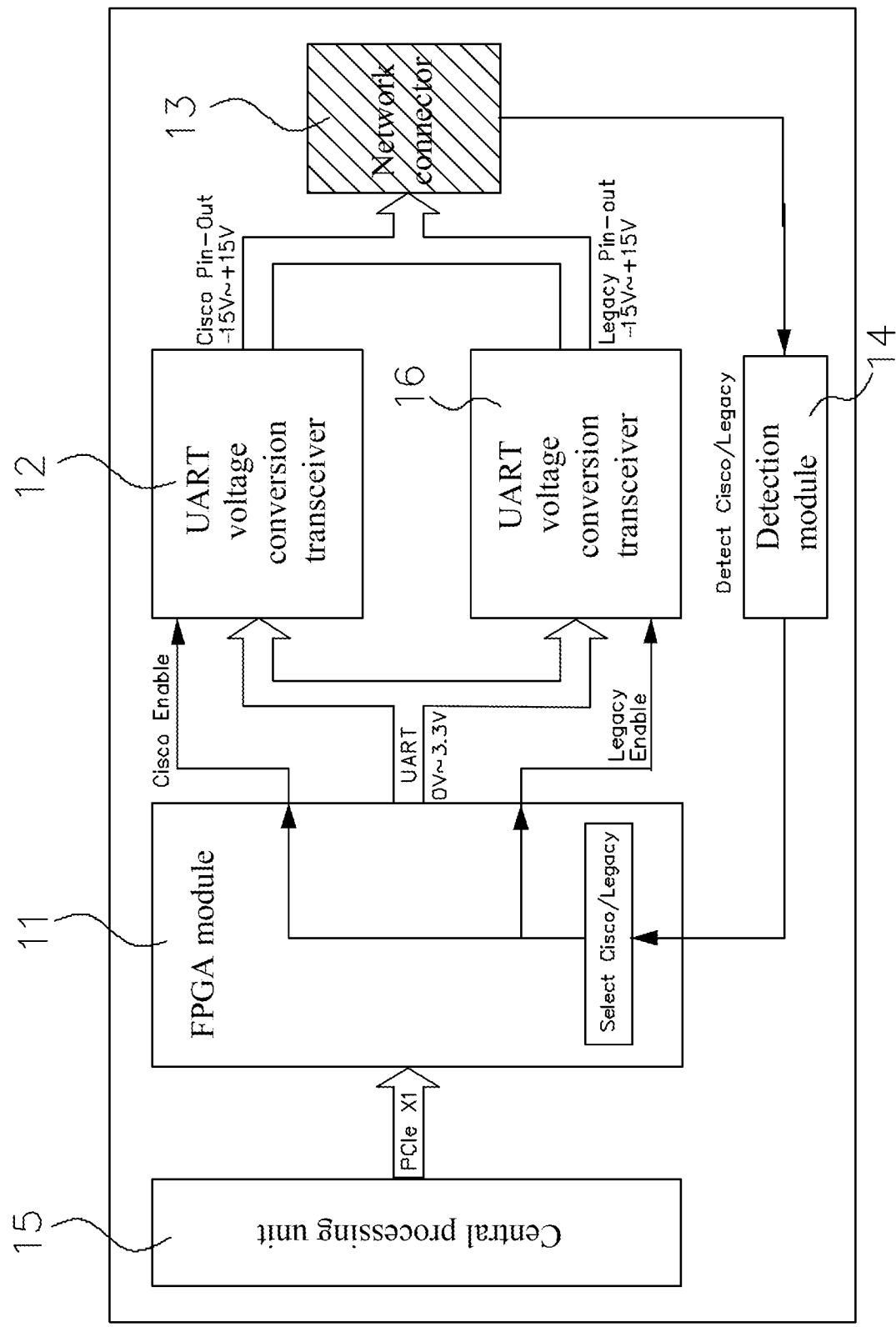
FIG. 3 is a schematic block diagram of a network input/output structure of an electronic device in accordance with the present invention.

The present invention relates to a network input/output structure of an electronic device. With reference to FIG. 3 for a network input/output structure of an electronic device in accordance with the present invention, the network input/ output structure of an electronic device comprises: a Field Programmable Gate Array (FPGA) module 11, a plurality of UART voltage conversion transceivers 12, an UART voltage conversion transceiver 16, at least one network connector 13 and at least one detection module 14.

Wherein, the FPGA module 11 is electrically coupled to a central processing unit 15 (CPU) of the electronic device, and has a controller for performing a logic operation.

Each UART voltage conversion transceiver 12, and the UART voltage conversion transceiver 16 are electrically coupled to the FPGA module 11, and each UART voltage conversion transceiver 12 and the UART voltage conversion transceiver 16 has an input/output pin definition of a network device of a corresponding brand specification.

The network connector 13 is electrically coupled to the UART voltage conversion transceivers 12 and the UART voltage conversion transceiver 16 and provided for the use by an external network device (not shown in the figure). Each UART voltage conversion transceiver 12 and the UART voltage conversion transceiver 16 are provided for converting an UART message into a RS232 message, so that the network connector 13 can transmit and receive a network message.

Wherein, the external network device includes a router, a hub, a switch, and an IP sharer, but the invention is not limited to such arrangement.

The detection module 14 is electrically coupled to the network connector 13 and the FPGA module 11 and provided for detecting an exclusive pin definition of a network device of the network connector 13, and sending the detected pin definition to the FPGA module 11.

With the aforementioned components, the FPGA module 11 uses the detection module 14 to detect a pin definition to confirm a brand specification of an external network device and turn on the UART voltage conversion transceiver 12 and a voltage conversion chip of the UART voltage conversion transceiver 16 of a network device of the brand specification, so that the network device transmits the network information through the UART voltage conversion transceiver 12 and the UART voltage conversion transceiver 16.

In FIG. 3, the network connector 13 is a RJ45 connector.

In FIG. 3, the network devices of the brand specifications of this embodiment include a Cisco's network device and a Legacy's network device. If the pin definition detected by the detection module 14 is the Cisco's network device, then the FPGA module 11 will turn on a voltage conversion chip of the UART voltage conversion transceiver 12 of the Cisco's network device, and turn off a voltage conversion chip of the UART voltage conversion transceiver 16 of the Legacy's network device. On the contrary, if the pin definition detected by the detection module 14 is the Legacy's network device, then the FPGA module 11 will turn on a voltage conversion chip of the UART voltage conversion transceiver 16 of the Legacy's network device and turn off a voltage conversion chip of the UART voltage conversion transceiver 12 of the Cisco's network device, so as to achieve the switching effect.

This invention simply uses the Cisco's network device and the Legacy's network device as examples for illustrating the switching effect of the invention. These network devices are external network devices of different brand specifications, but the invention is not limited to such arrangement.

For more more detailed description, the detection module 14 pre-stores the pin definitions of multiple network devices of different brand specifications, and pre-designates a first detection pin, a second detection pin, and a third detection pin, the steps of the detection module 14 to detect the exclusive pin definition of a network device connected to the network connector 13 are as follows:

step 1: the detection module 14 detects a voltage of the first detection pin of the network connector 13, and compares the voltage with the pin definitions of multiple pre-stored network devices of different brands, if it happens to be only if it meets a pin definition of a brand specification network device, transfer the pin definition of the brand specification network device to the FPGA module 11, and go to step 5; if it does not meet a pin definition of any brand specification network device or meet the pin definition of multiple brand specifications network devices at the same time, then go to step 2;

step 2: the detection module 14 detects a voltage of the second detection pin of the network connector 13, and compares the voltage with the pin definitions of multiple pre-stored network devices of different brands, if it happens to be only if it meets a pin definition of a brand specification network device, transfer the pin definition of the brand specification network device to the FPGA module 11, and go to step 5; if it does not meet a pin definition of any brand specification network device or meet the pin definition of multiple brand specifications network devices at the same time, then go to step 3;

step 3: the detection module 14 detects a voltage of the third detection pin of the network connector 13, and compares the voltage with the pin definitions of multiple pre-stored network devices of different brands, if it happens to be only if it meets a pin definition of a brand specification network device, transfer the pin definition of the brand specification network device to the FPGA module 11, and go to step 5; if it does not meet a pin definition of any brand specification network device or meet the pin definition of multiple brand specifications network devices at the same time, then go to step 4;

step 4: end the procedure of the detection module 14 detecting the exclusive pin definition of the network device 13 connected to the connector;

step 5: the FPGA module 11 uses the pin definitions detected by the detection module 14 to determine the brand specification of the external network device, and turn on a voltage conversion chip of the UART voltage conversion transceiver 12 corresponding to the brand specification, and enable the network device to transmit network information to each other through the UART voltage conversion transceiver 12, and turn off one of the voltage conversion chips of all UART voltage conversion transceivers 16 that correspond to other brand specifications, thereby switching to connect to external network device.

Wherein the first detection pin is a first pin position selected from the pin definitions of multiple pre-stored network devices of different brand specifications, the first pin position allows to have the most different voltages among network device of different brand specifications.

Wherein the second detection pin is a second pin position selected from the pin definitions of multiple pre-stored network devices of different brand specifications, the second pin position allows to have the second most different voltages among network device of different brand specifications.

Wherein the third detection pin is a third pin position selected from the pin definitions of multiple pre-stored network devices of different brand specifications, the third pin position allows to have the third most different voltages among network device of different brand specifications.

The present invention has the following advantages: The present invention provides a network input/output structure of an electronic device, wherein an exclusive pin definition of an external network device is detected to achieve the effect of switching and connecting to external network devices of various different brand specifications automatically. Since the network input/output structure is connected to network devices of various different brand specifications having their own exclusive pin definition, therefore the conventional network input/output structure of an electronic device can be used by exclusive network devices only, but cannot be used with a combination of different network devices. It is necessary to manufacture a device for the output through other pin definitions again before the network input/output structure can be used in other network devices. Therefore, the present invention is convenient to use, and the cost is low.

In summation of the description above, the network input/output structure of an electronic device in accordance with the present invention complies with patent application requirements, and thus is duly file for patent application and is submitted to the Patent and Trademark Office for review and granting of the commensurate patent rights.

While the invention has been described by means of specific embodiments, numerous modifications and variations could be made thereto by those skilled in the art without departing from the scope and spirit of the invention set forth in the claims.

What is claimed is:

1. A network input/output structure of an electronic device, comprising:
   a FPGA module, electrically coupled to a central processing unit (CPU) of the electronic device, and having a controller for performing a logic operation;
   a plurality of UART voltage conversion transceivers, each being electrically coupled to the FPGA module, and having an input/output pin definition corresponding to a brand specification network device;
   a network connector, electrically coupled to the UART voltage conversion transceivers, and provided for the use by an external network device; and
   a detection module, electrically coupled to the network connector and the FPGA module, for detecting an exclusive pin definition of a network device coupled to the network connector and sending the detected pin definition to the FPGA module;
   the detection module pre-stores the pin definitions of multiple network devices of different brand specifications, and pre-designates a first detection pin, a second detection pin, and a third detection pin, the steps of the detection module to detect the exclusive pin definition of a network device connected to the network connector are as follows:
   step 1: the detection module detects a voltage of the first detection pin of the network connector, and compares the voltage with the pin definitions of multiple pre-stored network devices of different brands, if it happens to be only if it meets a pin definition of a brand specification network device, transfer the pin definition of the brand specification network device to the FPGA module, and go to step 5; if it does not meet a pin definition of any brand specification network device or meet the pin definition of multiple brand specifications network devices at the same time, then go to step 2;
   step 2: the detection module detects a voltage of the second detection pin of the network connector, and compares the voltage with the pin definitions of multiple pre-stored network devices of different brands, if it happens to be only if it meets a pin definition of a brand specification network device, transfer the pin definition of the brand specification network device to the FPGA module, and go to step 5; if it does not meet a pin definition of any brand specification network device or meet the pin definition of multiple brand specifications network devices at the same time, then go to step 3;
   step 3: the detection module detects a voltage of the third detection pin of the network connector, and compares the voltage with the pin definitions of multiple pre-stored network devices of different brands, if it happens to be only if it meets a pin definition of a brand specification network device, transfer the pin definition of the brand specification network device to the FPGA module, and go to step 5; if it does not meet a pin definition of any brand specification network device or meet the pin definition of multiple brand specifications network devices at the same time, then go to step 4;
   step 4: end the procedure of the detection module detecting the exclusive pin definition of the network device connected to the connector;
   step 5: the FPGA module uses the pin definitions detected by the detection module to determine the brand specification of the external network device, and turn on a voltage conversion chip of the UART voltage conversion transceiver corresponding to the brand specification, and enable the network device to transmit network information to each other through the UART voltage conversion transceiver, and turn off one of the voltage conversion chips of all UART voltage conversion transceivers that correspond to other brand specifications, thereby switching to connect to external network device.

2. The network input/output structure of an electronic device according to claim 1, wherein the network connector is a RJ45 connector.

3. The network input/output structure of an electronic device according to claim 1, wherein the external network device comprises a router, a hub, a switch, and an IP sharer.

4. The network input/output structure of an electronic device according to claim 1, wherein the network devices of the brand specifications include Cisco network device, and Legacy network device.

5. The network input/output structure of an electronic device according to claim 1, wherein the first detection pin is a first pin position selected from the pin definitions of multiple pre-stored network devices of different brand specifications, the first pin position allows to have the most different voltages among network device of different brand specifications.

6. The network input/output structure of an electronic device according to claim 1, wherein the second detection pin is a second pin position selected from the pin definitions of multiple pre-stored network devices of different brand specifications, the second pin position allows to have the second most different voltages among network device of different brand specifications.

7. The network input/output structure of an electronic device according to claim 1, wherein the third detection pin is a third pin position selected from the pin definitions of multiple pre-stored network devices of different brand specifications, the third pin position allows to have the third most different voltages among network equipment of different brand specifications.

* * * * *